US011062404B2

(12) United States Patent
Albee et al.

(10) Patent No.: US 11,062,404 B2
(45) Date of Patent: Jul. 13, 2021

(54) DETERMINING SAVINGS IN CLIMATE CONTROL SYSTEMS

(71) Applicant: Powertron Global, LLC, Austin, TX (US)

(72) Inventors: Peter Nathan Albee, Austin, TX (US); Kevin Carriere, Austin, TX (US)

(73) Assignee: Powertron Global, LLC, Austin, TX (US)

( * ) Notice: Subject to any disclaimer, the term of this patent is extended or adjusted under 35 U.S.C. 154(b) by 927 days.

(21) Appl. No.: 13/745,568

(22) Filed: Jan. 18, 2013

(65) Prior Publication Data

US 2014/0207501 A1 Jul. 24, 2014

(51) Int. Cl.
| | | |
|---|---|---|
| *G06Q 50/06* | (2012.01) | |
| *G06Q 10/06* | (2012.01) | |
| *F25B 49/00* | (2006.01) | |
| *F24F 11/46* | (2018.01) | |
| *F24F 11/47* | (2018.01) | |

(52) U.S. Cl.
CPC ........... *G06Q 50/06* (2013.01); *G06Q 10/063* (2013.01); *F24F 11/46* (2018.01); *F24F 11/47* (2018.01); *F25B 49/005* (2013.01); *G06Q 10/06375* (2013.01)

(58) Field of Classification Search
None
See application file for complete search history.

(56) References Cited

U.S. PATENT DOCUMENTS

| | | | | |
|---|---|---|---|---|
| 4,325,223 | A | * | 4/1982 | Cantley ........................ 62/126 |
| 4,768,346 | A | * | 9/1988 | Mathur ................... F25B 49/02 165/11.1 |
| 6,286,323 | B1 | * | 9/2001 | Sgarbi ..................... C09K 5/10 62/114 |
| 7,533,536 | B1 | * | 5/2009 | Zugibe et al. .................. 62/127 |
| 7,945,423 | B2 | | 5/2011 | Seigel |
| 2002/0055358 | A1 | | 5/2002 | Hebert |
| 2002/0124992 | A1 | * | 9/2002 | Rainer et al. ................. 165/11.1 |
| 2004/0239494 | A1 | | 12/2004 | Kennedy et al. |
| 2005/0194455 | A1 | * | 9/2005 | Alles ............................. 236/1 B |
| 2005/0223720 | A1 | * | 10/2005 | Miller et al. .................... 62/129 |
| 2006/0117767 | A1 | * | 6/2006 | Mowris .......................... 62/149 |
| 2007/0256432 | A1 | * | 11/2007 | Zugibe ................... F25B 49/02 62/115 |
| 2008/0016888 | A1 | * | 1/2008 | Kates .................... F24F 3/1603 62/127 |

(Continued)

FOREIGN PATENT DOCUMENTS

WO WO-2014113026 A3 7/2014

OTHER PUBLICATIONS

Yang, "A Comparative Analysis and Validation of Two DX Cooling Coil Modeling Methods," 2010, ASHRAE Transactions, vol. 116, Part 2, pp. 460-475.*

(Continued)

*Primary Examiner* — Ivan R Goldberg
(74) *Attorney, Agent, or Firm* — Schwegman Lundberg & Woessner, P.A.

(57) ABSTRACT

The method and device of the present disclosure can determine energy or cost savings of a climate control system, such as can be attributed to a treatment that has been incorporated into a climate control system.

25 Claims, 7 Drawing Sheets

(56) References Cited

U.S. PATENT DOCUMENTS

| | | | |
|---|---|---|---|
| 2009/0187445 A1* | 7/2009 | Barclay | G06F 17/5004 |
| | | | 702/60 |
| 2010/0179703 A1* | 7/2010 | Singh et al. | 700/291 |
| 2010/0326470 A1* | 12/2010 | Seippel | B08B 3/02 |
| | | | 134/14 |
| 2011/0082651 A1* | 4/2011 | Mowris | F24F 11/006 |
| | | | 702/45 |
| 2011/0112875 A1* | 5/2011 | Johnson | G06Q 10/063 |
| | | | 705/7.11 |
| 2011/0113801 A1 | 5/2011 | Rajasekaran et al. | |
| 2011/0137468 A1* | 6/2011 | Duncan | F24F 5/0035 |
| | | | 700/277 |
| 2013/0151212 A1* | 6/2013 | Gray et al. | 703/2 |

OTHER PUBLICATIONS

Zhou, "Energy Simulation in the Variable Refrigerant Flow Air-Conditioning System under Cooling Conditions," 2007, Energy and Buildings, vol. 39, pp. 212-220.*

"Application Serial No. PCT/US2013/022279, International Preliminary Report on Patentability dated Oct. 8, 2015", 7 pgs.

"International Application Serial No. PCT/US2013/022279, International Search Report dated Sep. 18, 2015", 3 pgs.

"International Application Serial No. PCT/US2013/022279, Written Opinion dated Sep. 18, 2015", 5 pgs.

* cited by examiner

DETERMINING SAVINGS IN CLIMATE CONTROL SYSTEMS

BACKGROUND

Climate control systems have been used to provide heating, ventilation, air conditioning, and refrigeration within buildings. Performance of the climate control systems can degrade over time, which can increase energy consumption and monthly energy bills.

OVERVIEW

Climate control systems such as such water or air cooled direct expansion heating, ventilation, air condition and refrigeration systems (referred to herein as "HVACR systems"), water cooled and air-cooled chiller systems (referred to herein as "WCC systems") can be used for heating, ventilation, air conditioning, and moving air within a building. Over time, performance of a climate control system can degrade. For example, the capacity of the climate control system can decrease and reduce the performance of the climate control system. The decreased capacity can cause an increase in energy consumption and thereby increase the cost of operating the climate control system. In an effort to decrease or minimize the cost of operating climate control systems, various treatments (e.g., products and equipment) can be incorporated into climate control systems, such as to restore or increase the capacity or performance. However, accurately measuring savings attributable to these treatments can be difficult.

In certain approaches, savings attributed to a treatment can be determined by comparing an average electrical usage before and after the treatment was incorporated. For example, data such as power consumption (kilowatts) and temperatures can be logged over a period of time to determine the average electrical usage before the treatment. After the treatment is incorporated, new data over a subsequent period of time can be gathered to develop the average electrical usage after the treatment. The averages can be compared to each other to determine if the average of electrical usage increased or decreased after the treatment to infer any saving attributable to the treatment.

However, such an approach can have inaccuracies and the outcome of the logged data can be affected by various variables. For example, variables such as temperature, weather, humidity, uncontrolled physical space of a building, varying temperature settings in rooms within a building, a number of people that enter and leave a building, how many windows are open, etc., can affect the energy usage and thereby affect the logged data. Therefore, such an approach may fail to provide an accurate assessment of energy savings.

In addition to having inaccuracies, such an approach can be ineffective at calculating savings attributed to treatments such as can restore capacity of the climate control systems. As described herein, a climate control system can degrade in performance and lose capacity over time. The loss of capacity can cause an increase in energy consumption because the system continues to do the required work with less ability, and has to operate for longer periods of time to accomplish the work goal (e.g., climate control settings and requirements). Various treatments can restore the capacity or prevent the capacity of the climate control system from decreasing. Restoring the capacity can increase the efficiency of the climate control system and inhibiting or preventing the loss of capacity can inhibit or prevent a future increase in energy consumption. In other words, the treatment can decrease or minimize future electrical usage from an increase that would otherwise occur, without the treatment, due to the decreasing efficiency caused by capacity loss of the climate control system. The variable environment presents differing amounts of work, which can directly affect the amount of energy over time used. Thus, comparing electrical usage of logged data over time while allowing the variables to influence the energy usage prior to and after the treatment does not provide an accurate analysis of the savings attributable to the treatment.

The present disclosure relates generally to a method and system for determining savings in a climate control system. The methods and systems can enable a treatment savings analysis to be performed that is accurate and is not affected by various variables, as described herein.

This overview is intended to provide an overview of subject matter of the present patent application. It is not intended to provide an exclusive or exhaustive explanation of the invention. The detailed description is included to provide further information about the present patent application.

DETAILED DESCRIPTION

Figure 1A:
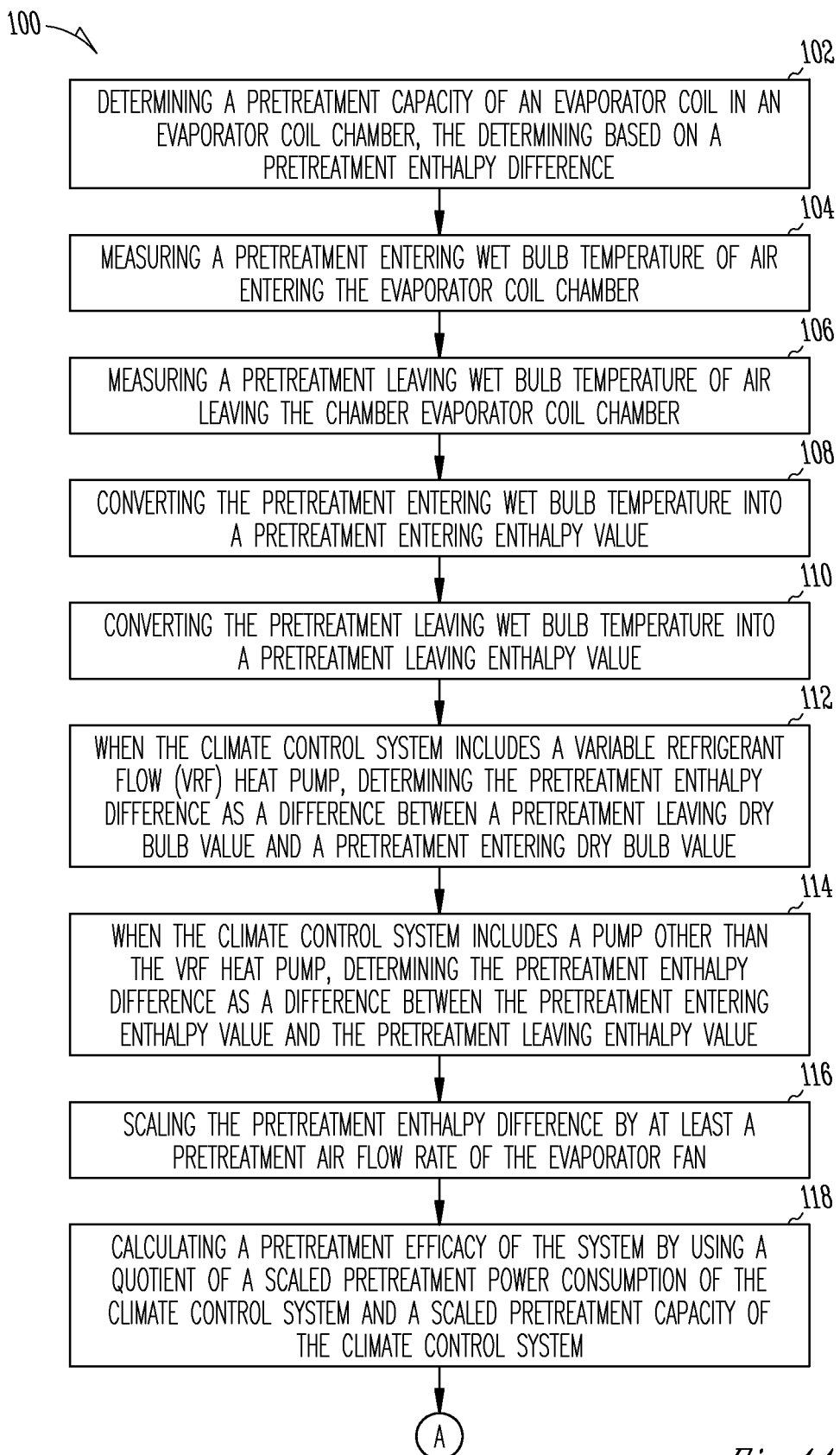
FIGS. 1A-1C are flow diagrams illustrating a method, in accordance with one or more examples of the present disclosure.

The present disclosure relates generally to methods and systems for determining savings in climate control systems. The climate control systems can include heating, ventilation, air conditioning, and refrigeration systems (referred to herein as "HVACR systems") such as a water cooled direct exchange (DX) single phase HVACR system, a water cooled DX three phase HVACR system, an air cooled DX single phase HVACR system, an air cooled DX three phase HVACR system. Additionally or alternatively, the climate control systems can include water-cooled and air-cooled chiller systems (referred to herein as "WCC systems").

The methods and systems can enable a treatment savings analysis to be performed such that energy savings can be determined or verified on a climate control system that has incorporated a treatment. Treatments can, for example, include products or equipment that can inhibit or prevent the capacity from decreasing, or that can restore previously lost capacity in a climate control system.

Examples of treatments that can inhibit or prevent the capacity from decreasing or that can restore previously lost capacity are described in U.S. Pat. No. 6,369,006, filed May 2, 2000 (entitled "AIR CONDITIONING AND REFRIGERATION SYSTEM USING A CALCIUM SALT OF DIALKYL AROMATIC SULFONIC ACID"), and are further described in U.S. Pat. No. 6,362,139, filed May 2, 2000 (entitled "AIR CONDITIONING AND REFRIGERATION SYSTEM USING A SULFUR CONTAINING POLAR COMPOUND"), and are further described in U.S. Pat. No. 6,286,323, filed May 2, 2000 (entitled "AIR CONDITIONING AND REFRIGERATION SYSTEM USING A SULFONATE CONTAINING CALCIUM SALT OF DIALKYL AROMATIC SULFONIC ACID AND NONYLATED PHENYLAMINE DERIVATIVES IN A POLAR COMPOUND"), and are further described in U.S. Pat. No. 6,276,147, filed May 2, 2000 (entitled "AIR CONDITIONING AND REFRIGERATION SYSTEM USING A CONCENTRATED POLAR SOLUTION"), the entire disclosures of which are hereby incorporated by reference herein, including their description of treatments that can inhibit or prevent HVACR system capacity from decreasing or that can restore previously lost capacity.

The present methods and systems can enable a treatment savings analysis to be performed that is more accurate than existing approaches. For example, the outcome of the present treatment saving analysis need not be affected by variables such as temperature, weather, humidity, uncontrolled physical space of building, varying temperature settings in rooms within the building, a number of people that enter and leave a building, how many windows are open, etc., as described herein.

The present methods and systems can determine or verify the efficiency of the climate control systems, e.g., in real-time, based on enthalpy. Generally, enthalpy can be used for sizing a heat exchanger coil in a theoretical model before assembly. However, the present methods and systems can use enthalpy to calculate the improvement in the capacity of the climate control systems due to a treatment. The enthalpy change can be converted to power (e.g., watts and then to a currency such as dollars so that a savings value can be determined for the new improvements in capacity.

The methods and systems of the present disclosure can be used to calculate improvements in capacity. The present methods and systems can allow the pretreatment energy efficiency (e.g., baseline electrical energy input needed to provide baseline capacity output) to be projected, such as in terms of post-treatment energy efficiency rate adjusted for additional capacity restored. This can accurately give the full range of efficiency improvement and can allow for true energy performance improvements to be measured. With efficiency improvement measured, a financial analysis can be conducted for a specific piece of equipment and can be measured on real data and not a theoretical model. That is, the methods and systems can be used to collect and analyze specific criteria on the climate control system to calculate, using enthalpy, its real efficiency gain or loss.

Different procedures and calculations can be used for a direct exchange climate control system (HVACR) and for a water-cool chiller (WCC) climate control system.

Direct Exchange Climate Control System

Direct exchange (DX) climate control systems are heating ventilation, air conditioning, and refrigeration (HVACR) systems, and examples can include: a water cooled DX single phase HVACR system, a water cooled DX three phase HVACR system, an air cooled DX single phase HVACR system, or an air cooled DX three phase HVACR system.

As described herein, the method can be used to determine a treatment savings in a climate control system. Various measurements can be taken before administering the treatment. In an example, the method can include taking one or more of the following pretreatment measurements:

1. Measure the current dry bulb and wet bulb delta temperature across the evaporator of the climate control system.
2. Measure the dry bulb delta temperature evaporator coil.
3. Measure the airflow of the evaporator fan, e.g., in cubic feet per minute (CFM)
4. Measure the airflow of the outdoor air in cubic feet per minute.
5. Measure the outdoor air temperature.
6. Measure the outdoor air humidity.
7. Measure the total wattage of the climate control system.
8. Measure the voltage of the climate control system.
9. Measure the current (e.g., amperage) of the climate control system. Additionally, the method can include recording the values/numbers for the pretreatment measurements, model number, serial number, and age of the equipment, and the date and time of the pretreatment data verification. The measurements can be taken with calibrated equipment.

The present disclosure can include method 100 for determining savings in a climate control system. At 102, the method 100 can include determining a pretreatment capacity of an evaporator coil in an evaporator coil chamber. Determining the pretreatment capacity can be based on a pretreatment enthalpy difference. The pretreatment enthalpy difference can be determined as an enthalpy difference across the evaporator coil in an evaporator coil chamber of the climate control system. Determining the pretreatment enthalpy difference can include measuring a pretreatment entering wet bulb temperature of air entering the evaporator coil and measuring a pretreatment leaving wet bulb temperature of air leaving the evaporator coil. At 104, a pretreatment entering wet bulb temperature of air entering the evaporator coil can be measured. At 106, a leaving wet bulb temperature of air leaving the evaporator coil can be measured. The entering and leaving wet bulb temperatures may be measured using a calibrated certified digital psychrometer. The method 100 can include, at 108, converting the pretreatment entering wet bulb temperature into a pretreatment entering enthalpy value and, at 110, converting the pretreatment leaving wet bulb temperature into a pretreatment leaving enthalpy value. For example, the wet bulb temperatures can be converted into enthalpy values using a psychrometric chart. At 112, the method 100 can include, when the climate control system includes a variable refrigerant flow (VRF) heat pump, determining the pretreatment enthalpy difference as a difference between a pretreatment leaving dry bulb value and a pretreatment entering dry bulb value. At 114, the method 100 can include, when the climate control system includes a pump other than the VRF heat pump, calculating the difference between the pretreatment entering enthalpy value and the pretreatment leaving enthalpy value.

The capacity of a climate control system can reflect the climate control systems ability to heat or cool a specific building or space. At 116, the pretreatment capacity can be calculated by scaling the pretreatment enthalpy difference by at least a pretreatment air flow rate of the evaporator fan. In an example, the pretreatment capacity ($C_{pre}$) can be determined by equation (1):

$$C_{pre} = CFM_{pre} * X * \Delta H_{pre} \hspace{2cm} \text{Equation (1)}$$

where $CFM_{pre}$ can represent a pretreatment air flow of the evaporator fan, e.g., in cubic feet per minute or cubic meters per minute, $\Delta H_{pre}$ can represent the pretreatment enthalpy difference, and X can be a scaling value, such as within a range of from 1.5 to 10.0. The value of X can be based on a function of air density multiplied by time (e.g., a value of 60 seconds (s)). Thus, depending on altitude or different air gasses, the value of X may change. For example, assuming the air has a density of 0.075 $lb_m/ft^2$, X can equal 4.5.

Once the pretreatment capacity has been calculated, at 118, the method 100 can include calculating a pretreatment efficacy (e.g, watts per ton) of the system. At 118, the pretreatment efficacy of the system can be calculated by using a quotient of a scaled pretreatment power of the climate control system and a scaled pretreatment capacity of the climate control system. In an example, the pretreatment efficacy ($E_{pre}$) can be calculated by equation (2):

$$E_{pre} = \frac{(V_{pre} * A_{pre} * \text{Power Factor})}{\left(\frac{C_{pre}}{Y}\right)} \quad \text{Equation (2)}$$

where $V_{pre}$ can represent a pretreatment measured voltage of the climate control system, $A_{pre}$ can represent a pretreatment measured amperage of the climate control system, Y can represent a scaling value such as within a range of from 500 to 30000, and the Power Factor can represent another scaling value within a range of from 0.001 and 5.00. The Power Factor can be a predetermined or specified constant, and can be based on a type of power requirement of the climate control system and a number of phases of the climate control system. The power factor of an AC electrical power system can be represented as the ratio of the real power flowing to the load to the apparent power in the circuit, and can be a dimensionless number. The power factor can be calculated with electrical metering equipment. AC power flow can have three components: 1) real power (also known as active power) (P), such as can be measured in watts (W), 2) apparent power (S), such as can be measured in volt-amperes (VA), and 3) reactive power (Q), such as can be measured in reactive volt-amperes (var)). In an example, the power factor can be represented using equation (3):

$$\text{Power Factor} = \frac{(P)}{(S)} \quad \text{Equation (3)}$$

For a perfectly sinusoidal waveform, P, Q, and S can be expressed as vector that can form a vector triangle such that $S^2 = P^2 * Q^2$. If $\gamma$ is the phase angle between the current and voltage, then the power factor is equal to the cosine of the phase angle $|\cos \gamma|$, and $|P| = |S| |\cos \gamma|$.

Once the pretreatment efficacy has been calculated, at 120, the method 100 can include administering a treatment to the climate control system. As described herein, the treatment can include using a chemical treatment, a piece of equipment, or both. The method 100, at 122, can include waiting a period of time after the treatment before calculating a post-treatment capacity of the evaporator coil. For example, if a chemical treatment is administered, the benefits of the treatment can take the period of time before the full extent of the benefits can be reached. In an illustrative example, the period of time can be at least four weeks. However, other time periods are contemplated and can be based on the type of treatment that is administered. For example, the time period could include less than 24 hours, one or more days, and one or more weeks.

Various measurements can be taken after administering the treatment and waiting the time period. The post-treatment measurements can include the same measurements taken for the pretreatment stage. In an example, the method can include taking one or more of the following post-treatment measurements:

1. Measure the current dry bulb and wet bulb delta temperature across the evaporator of the climate control system.
2. Measure the dry bulb delta temperature of the evaporator coil.
3. Measure the airflow of the evaporator fan, e.g., in cubic feet per minute (CFM).
4. Measure the airflow of the outdoor air, e.g., in cubic feet per minute.
5. Measure the outdoor air temperature.
6. Measure the outdoor air humidity.
7. Measure the total power consumption of the climate control system.
8. Measure the voltage of the climate control system.
9. Measure the current of the climate control system.

At 122, the post-treatment capacity of the evaporator coil can be calculated after waiting a time period after the treatment has been administered. In one example, the time period can be approximately four weeks. In an example, at 124, the method 100 can include determining a post-treatment capacity of the evaporator coil in an evaporator coil chamber based on a post-treatment enthalpy difference. The post-treatment enthalpy difference can be determined as an enthalpy difference across the evaporator coil in an evaporator coil chamber of the climate control system. Determining the post-treatment enthalpy difference can include measuring a post-treatment entering wet bulb temperature of air entering the evaporator coil and measuring a post-treatment leaving wet bulb temperature of air leaving the evaporator coil. At 126, a post-treatment entering wet bulb temperature of air entering the evaporator coil chamber can be measured. At 128, a post-treatment leaving wet bulb temperature of air leaving the evaporator coil chamber can be measured. As described above, the entering and leaving wet bulb temperatures may be measured using a calibrated certified digital psychrometer.

The method 100 can include, at 130, converting the post-treatment entering wet bulb temperature into a post-treatment entering enthalpy value and, at 132, converting the post-treatment leaving wet bulb temperature into a post-treatment leaving enthalpy value. The wet bulb temperatures can be converted into enthalpy values using a psychrometric chart. At 134, the method 100 can include, when the climate control system includes a VRF heat pump, determining the pretreatment enthalpy difference as a difference between a post-treatment leaving dry bulb value and a post-treatment entering dry bulb value. At 136, the method 100 can include, when the climate control system includes a pump other than the VRF heat pump, calculating the difference between the post-treatment entering enthalpy value and the post-treatment leaving enthalpy value.

At 138, the post-treatment capacity can be calculated by scaling the post-treatment enthalpy difference by at least a post-treatment air flow rate of the evaporator fan. In an example, the post-treatment capacity can be determined by equation (5):

$$C_{post} = CFM_{post} * X * \Delta H_{post} \quad \text{Equation (5)}$$

Where $CFM_{post}$ can represent a post-treatment air flow of the evaporator fan, e.g., in cubic feet per minute, $\Delta H_{post}$ can represent the post-treatment enthalpy difference, and X can represent a scaling value such as can be within a range of from 1.5 to 10.0. As described herein, the value of X can be based on a function of air density multiplied by time, e.g., a value of 60 seconds (s). Thus, depending on altitude or different air gasses, the value of X may change. For example, assuming the air has a density of 0.075 $lb_m/ft^2$, X can equal 4.5.

Once the post-treatment capacity has been calculated, at 140, the method 100 can include calculating a post-treatment efficacy, e.g., watts per ton, of the system. At 140, the post-treatment efficacy of the system can be calculated by using a quotient of a scaled post-treatment power of the climate control system and a scaled post-treatment capacity of the climate control system. In an example, the post-treatment efficacy ($E_{pre}$) can be calculated by equation (6):

$$E_{post} = \frac{(V_{post} * A_{post} * \text{Power Factor})}{\left(\frac{C_{post}}{Y}\right)} \quad \text{Equation (6)}$$

Where $V_{post}$ can represent a post-treatment measured voltage of the climate control system, $A_{post}$ can represent a post-treatment measured amperage of the climate control system, Y can represent a scaling value such as within a range of from 500 to 30000, and the Power Factor can represent another scaling value within a range of from 0.001 and 5.00.

In an example, the post-treatment efficacy can be normalized and be represented as a normalized post-treatment efficacy. For example, at 142, the method 100 can include where the post-treatment efficacy is a normalized post-treatment efficacy. The normalized post-treatment efficacy can represent an adjustment of the post-treatment amperage measurement, e.g., downward or upward approximately 70%, and multiplied by the total percentage difference in outside air temperature, reduction in the condenser water temperature, or both, to normalize the calculations.

The normalized post-treatment efficacy can be used to adjust for the effects of weather on amperage. The normalized post-treatment efficacy can model the amperage and weather relationship, such that the kilowatts can be calculated to match the pretreatment amperage. When the post-treatment outside air temperature is warmer than the pretreatment outside air temperature, the adjusted amperage can be decreased to be less than the post-treatment amperage. When the post-treatment outside air temperature is cooler than the pretreatment outside air temperature, the adjusted amperage can be increased to be greater than the post-treatment amperage.

Determining the normalized post-treatment efficacy can include determining whether the climate control system is an air-cooled direct expansion HVACR system or a water-cooled direct expansion or flooded HVACR system.

In an example, when the climate control system includes an air-cooled direct expansion or flooded HVACR system, the method can include determining whether a post-treatment outside air temperature is greater than a pretreatment outside air temperature. When the post-treatment outside air temperature is greater than the pretreatment outside air temperature, the normalized post-treatment efficacy can be calculated using equation (7):

$$nE_{post} = \frac{V_{post} * \left[\left(\frac{A_{post} - \frac{A_{post} * Z *}{\left(\frac{OAT_{post} - OAT_{pre}}{OAT_{pre}}\right)}\right)\right] * \text{Power Factor}}{\frac{C_{post}}{Y}} \quad \text{Equation (7)}$$

where $V_{post}$ can represent a post-treatment measured voltage of the climate control system, $A_{post}$ can represent a post-treatment measured amperage of the climate control system, $OAT_{post}$ can represent a post-treatment outside air temperature, $OAT_{pre}$ can represent a pretreatment outside air temperature, $C_{post}$ can represent a post-treatment capacity, Z can represent a scaling factor value such as within a range of from 0.1 to 1.0, Y can represent a scaling factor value such as within a range of from 500 to 30000, and the Power Factor can represent a scaling factor value such as within a range of from 0.001 and 5.00. Z can represent the average amperage used by the compressor and can be subjectively determined such as based on an interpretation of how many amperes by percentage are used by the compressor versus other components in the climate control system such as a fan motor, a compressor warmer, a ventilation damper, and a pumps, etc. Thus, the value of Z can be within the range of from 0.1 (10 percent) to 1.0 (100 percent). In an example, Y can represent the BTU value or Joules. Thus, in an example, where the BTU value is 12,000, Y can be 12,000. However, the value of Y can vary such as between 500 and 30,000, e.g., depending on the BTU value.

In an example when the post-treatment outside air temperature is not greater than the pretreatment outside air temperature, then the normalized post-treatment efficacy ($nE_{post}$) can be calculated using equation (8):

$$nE_{post} = \frac{V_{post} * \left[\left(\frac{A_{post} * Z *}{\left(\frac{OAT_{pre} - OAT_{post}}{OAT_{pre}}\right)}\right) + A_{post}\right] * \text{Power Factor}}{\frac{C_{post}}{Y}} \quad \text{Equation (8)}$$

where $V_{post}$ can represent a post-treatment measured voltage of the climate control system, $A_{post}$ can represent a post-treatment measured amperage of the climate control system, $OAT_{post}$ can represent a post-treatment outside air temperature, $OAT_{pre}$ can represent a pretreatment outside air temperature, $C_{post}$ can represent a post-treatment capacity, Z can represent a value within a range of from 0.1 to 1.0, Y can represent a scaling value such as within a range of from 500 to 30000, and the Power Factor can represent a scaling value such as within a range of from 0.001 and 5.00.

When the climate control system includes the water-cooled direct expansion or flooded HVACR system, the method can include determining whether a post-treatment outside air temperature is greater than a pretreatment outside air temperature, and determining whether a post-treatment condenser water temperature is greater than a pretreatment condenser water temperature.

When the post-treatment outside air temperature is greater than the pretreatment outside air temperature and the post-treatment condenser water temperature is greater than the pretreatment condenser water temperature, then the normalized post-treatment watts per ton efficacy ($nE_{post}$) can be calculated using equation (9):

$$nE_{post} = \frac{V_{post} * \text{Power Factor} * \left[A_{post} - \left[\frac{Z * \left(\frac{OAT_{post} - OAT_{pre}}{OAT_{pre}}\right) *}{\left(A_{post} - \left(A_{post} * Z * \left(\frac{CWT_{post} - CWT_{pre}}{CWT_{pre}}\right)\right)\right)}\right]\right]}{\frac{C_{post}}{Y}} \quad \text{Equation (9)}$$

where $V_{post}$ can represent a post-treatment measured voltage of the climate control system, $A_{post}$ can represent a post-treatment measured amperage of the climate control system, $OAT_{post}$ can represent a post-treatment outside air temperature, $OAT_{pre}$ can represent a pretreatment outside air temperature, $C_{post}$ can represent a post-treatment capacity, $CWT_{post}$ can represent the post-treatment condenser water temperature, $CWT_{pre}$ can represent the post-treatment condenser water temperature, Z can represent a scaling value such as within the range of from 0.0 to 1.0, Y can represent a scaling value such as in the range of from 500 to 30000, and the Power Factor can represent a scaling value such as within a range of from 0.001 and 5.00.

When the post-treatment outside air temperature is not greater than the pretreatment outside air temperature and the post-treatment condenser water temperature is greater than the pretreatment condenser water temperature, then the normalized post-treatment efficacy ($nE_{post}$) can be calculated by Equation (10):

$$nE_{post} = \frac{V_{post} * \text{Power Factor} * \left[A_{post} + \left[\frac{Z*\left(\frac{OAT_{pre}-OAT_{post}}{OAT_{pre}}\right)*}{\left(A_{post}+\left(A_{post}*Z*\left(\frac{CWT_{pre}-CWT_{post}}{CWT_{pre}}\right)\right)\right)}\right]\right]}{\frac{C_{post}}{Y}} \quad \text{Equation (10)}$$

where $V_{post}$ can represent a post-treatment measured voltage of the climate control system, $A_{post}$ can represent a post-treatment measured amperage of the climate control system, $OAT_{post}$ can represent a post-treatment outside air temperature, $OAT_{pre}$ can represent a pretreatment outside air temperature, $C_{post}$ can represent a post-treatment capacity, $CWT_{post}$ can represent the post-treatment condenser water temperature, $CWT_{pre}$ can represent the post-treatment condenser water temperature, Z can represent a scaling value such as within the range of from 0.0 to 1.0, Y can represent a scaling value such as in the range of from 500 to 30000, and the Power Factor can represent a scaling value such as within a range of from 0.001 and 5.00.

At 144, the method 100 can include determining a pretreatment energy cost per usage time period. The usage time period can be, for example, days, months, or years. In an example, the usage time period can be a year. In an example, the pretreatment energy cost per usage time period can represent the cost to operate the climate control system for a year such as based on annual runtime hours. At 146, the pretreatment energy cost per usage time period can be determined by multiplying a cost per unit power by a product of a pretreatment power consumption by a usage time period. In an example, the pretreatment energy cost per usage time period ($CPU_{pre}$) can be calculated using Equation (11):

$$CPU_{pre}=[(kW_{pre})\times(\text{Usage Time Period})]\times\text{Cost per kW} \quad \text{Equation (11)}$$

where $kW_{pre}$ can represent a pretreatment power consumption, Usage Time Period can be the runtime per usage time period, e.g., hours per year, that the climate control system operates, and Cost per kW can be a monetary value per kilowatt. The pretreatment power consumption ($kW_{pre}$) can be determined by scaling a pretreatment measured voltage and a pretreatment measured amperage. In an example, the pretreatment power consumption ($kW_{pre}$) can be calculated using Equation (12):

$$kW_{pre} = \frac{(V_{pre}\times A_{pre}\times\text{Power Factor})}{1000} \quad \text{Equation (12)}$$

where $V_{pre}$ can represent a pretreatment measured voltage of the climate control system, $A_{pre}$ can represent a pretreatment measured amperage of the climate control system, and the Power Factor can represent a scaling value such as within a range of from 0.001 and 5.00.

At 148, the method 100 can include determining a revised pretreatment energy cost per usage time period based at least in part on the post-treatment capacity. At 150, the method 100 can include determining the revised pretreatment energy cost per usage time period by multiplying a cost per unit power by a product of an adjusted pretreatment power consumption and a usage time period. In an example, the revised pretreatment energy cost per usage time period (Revised $CPU_{pre}$) can be determined using equation (13):

$$\text{Revised } CPU_{pre}=[(\text{Adjusted } kW_{pre})\times(\text{Usage Time Period})]\times\text{Cost per kW} \quad \text{Equation (13)}$$

where Adjusted $kW_{pre}$ can represent an adjusted pretreatment power consumption, Usage Time Period can be the runtime per usage time period, e.g., hours per year, that the climate control system operates, and Cost per kW can be a monetary value per kilowatt. The revised pretreatment energy cost per year (Revised $CPU_{pre}$) can represent the cost of operating the equipment prior to the treatment with the additional tonnage (e.g., output) created by the treatment (e.g., additional or increased capacity).

At 152, the adjusted pretreatment power consumption can be determined by multiplying a scaled post-treatment capacity by a quotient of a scaled pretreatment power consumption and a scaled pretreatment capacity. In an example, the adjusted pretreatment power consumption can be determined using equation (14):

$$\text{Adjusted } kW_{pre} = \left(\frac{\frac{V_{pre}*A_{pre}*\text{Power Factor}}{1000}}{\frac{C_{pre}}{Y}}\right)*\left(\frac{C_{post}}{1000}\right) \quad \text{Equation (14)}$$

where $V_{pre}$ can represent a pretreatment measured voltage of the climate control system, $A_{pre}$ can represent a pretreatment measured amperage of the climate control system, $C_{post}$ can represent a post-treatment capacity of the evaporator coil, $C_{pre}$ can represent a pretreament capacity of the evaporator coil, Y can represent a scaling value such as in the range of from 500 to 30000, and the Power Factor can represent a scaling value such as within a range of from 0.001 and 5.00.

It can be advantageous to adjust the pretreatment power consumption because a significant part of the treatment benefits can be in creating additional capacity (output). In the pretreatment phase, obtaining this additional output would require using additional energy to produce the same level of output that, after treatment, is now provided by the gain in additional capacity created by adding of the efficiency-enhancing treatment to the system. To capture the true efficiency, the system or method can calculate the amount of energy needed to produce the new level of capacity at a previous efficacy, e.g., watts per ton ratio. The watts per ton ratio can be a quotient of the pretreatment power consumption and the scaled pretreatment capacity.

The equipment operating pretreatment has a measurable watts per ton (output) ratio. When the output increases due to the treatment, that same level of output would use a higher amount of watts per ton if the pretreatment could produce that level of output. A significant part of the treatment benefit can be in creating additional capacity that was not present in the pretreatment measurement. The energy needed to produce this new level of capacity can be calculated at the pretreatment watts per ton ratio to measure the full extent of the efficiency improvement. Because the pretreatment capacity is based on a ratio of energy required to produce actual output, when the system capacity is changed to increase its ability to produce more output, the energy input use changes. Because the efficiency ratio of the pretreatment does not account for the additional capacity that the system now has after treatment, the baseline can be adjusted to allow an accurate comparison to the post treatment.

The cost per usage time period can also be used to determine the operating cost of the unit, such as to calculate the annual return on investment when comparing pre and post treatment capacities, indicating how much it cost to run the unit for a year before and after the treatment was applied based on the watts per ton (output).

At 154, the method 100 can include determining the post-treatment energy cost per usage time period. The post-treatment energy cost per usage time period year can represent the cost of operating the climate control system after the treatment has been administered. At 154, the post-treatment energy cost per usage time period can be determined by multiplying a cost per unit power by a product of a scaled normalized post-treatment power consumption and a usage time period. At 144, the post-treatment energy cost per usage time period year ($CPU_{post}$) can be determined using equation (15):

$$CPU_{post} = \left(\left(\frac{nE_{post}}{1000}\right) * \text{Usage Time Period}\right) * \text{Cost per kW} \quad \text{Equation (15)}$$

where $nE_{post}$ can represent a normalized post-treatment efficacy, Usage Time Period can be the runtime per usage time period, e.g., hours per year, that the climate control system operates, and Cost per kW can be a monetary value per kilowatt. The normalized post-treatment efficacy ($nE_{post}$) can be calculated, such as described herein.

At 156, the method 100 can include calculating a savings per usage time period. The savings per usage time period can represent an amount of money saved by incorporating the treatment into the climate control system. At 156, the savings per usage time period can be calculated by multiplying a cost per unit power using a quotient of a difference between the revised pretreatment energy cost per usage time period and the post-treatment energy cost per usage time period. In an example, the savings (S) can be calculated using equation (16):

$$S = \left(\frac{\text{Revised } CPU_{pre} - CPU_{post}}{\text{Time Period}}\right) \quad \text{Equation (16)}$$

where the Revised $CPU_{pre}$ can represent the revised pretreatment energy cost per usage time period, the $CPU_{post}$ can represent the post-treatment energy cost per usage time period, and the Time Period can represent a time period, e.g., twelve months.

A return on investment (ROI) for the treatment can also be calculated, such as using the calculated savings. The return on investment can be calculated by using a quotient of the cost of the treatment and the calculated savings per time period. In an example, the return on investment (ROI) can be determined using equation (17):

$$ROI = \left(\frac{\text{Cost of Treatment}}{\text{Savings}}\right) \quad \text{Equation (17)}$$

where the Cost of Treatment can represent an overall cost of implementing the treatment, and S can represent the calculated saving per time usage period.

Water Cooled Chiller Systems

Water cooled chillers (WCC) are different from DX systems because they incorporate cooling water (or any other suitable liquid) as the medium versus just air. Air-cooled systems utilize both air and water as the medium. For climate control systems implementing a water cooled or air-cooled chiller systems (hereinafter referred to as "WCC systems"), the method can include taking the following pretreatment measurements:
1. Chilled Water Entering Temperature
2. Chilled Water Leaving Temperature
3. Condenser Water Entering
4. Condenser Water Leaving
5. Measure the refrigerant suction temperature at an inlet
6. Measure the refrigerant discharge temperature at an outlet
7. Measure the kilowatts (kW) of the climate control system.
8. Measure Volts
9. Measure Amperage
10. Measure flow (e.g., GPM (gallons per minute)) of the water or other fluid.

Additionally, the method can include recording the values/numbers for the pretreatment measurements, model number, serial number, or age of the equipment, and can include recording the date and time of the pretreatment data verification. The measurements can be taken using calibrated equipment.

The present disclosure can include method 200 for determining savings in a climate control system. At 202, the method 100 can include determining a pretreatment efficacy of the climate control system. At 204, the pretreatment efficacy can be a determined using a quotient of a pretreatment power consumption and a pretreatment load. In an example, the pretreatment efficacy ($E_{pre}$) can be determined using equation (18):

$$E_{pre} = \frac{(kW_{pre})}{L_{pre}} \quad \text{Equation (18)}$$

where $kW_{pre}$ can represent a pretreatment power consumption, and $L_{pre}$ can represent the pretreatment load, e.g., operating tons per hour. At 206, the pretreatment power consumption can be determined by multiplying a scaled pretreatment measured voltage with at least a pretreatment measured amperage. In an example, the pretreatment power consumption ($kW_{pre}$) can be calculated using equation (19):

$$kW_{pre} = \frac{(V_{pre} * A_{pre} * \text{Power Factor} * (B))}{1000} \quad \text{Equation (19)}$$

where $V_{pre}$ can represent a pretreatment measured voltage of the climate control system, $A_{pre}$ can represent a pretreatment measured amperage of the climate control system, B can represent a scaling value such as within a range of from 1.0 to 2.0, and the Power Factor can represent a scaling value such as within a range of from 0.001 and 5.00. B can represent a predetermined or specified constant and can be represented by 1.732 (square root of 3), which can be derived from Watt's law. However, in some examples, the predetermined or specified constant B can be adjusted or varied from 1.732.

At 208, the pretreatment load can be determined by scaling a pretreatment chiller water flow through a chiller barrel of the climate control system with at least a pretreatment chiller fluid temperature difference across the chiller barrel. In an example, the pretreatment load ($L_{pre}$) can be calculated using equation (20):

$$L_{pre} = \frac{(GPM_{pre} * 8.34 * 60 * \Delta CW_{pre})}{Y} \quad \text{Equation (20)}$$

where $GPM_{pre}$ can represent a pretreatment chiller water flow (e.g., gallons per minute) through a chiller barrel, $\Delta CW_{pre}$ can represent a pretreatment chiller water temperature difference across the chiller barrel, and Y can represent a scaling value such as within a range of from 500 to 30,000. The pretreatment chiller water temperature difference can be calculated by taking the difference between the pretreatment entering chiller water temperature and the pretreatment leaving entering chiller water temperature. In an example, the pretreatment chiller water temperature difference ($\Delta CW_{pre}$) can be determined by using equation (21):

$$\Delta CW_{pre} = \text{Entering } CWT_{pre} - \text{Leaving } CWT_{pre} \quad \text{Equation (21)}$$

where Entering $CWT_{pre}$ can represent an entering pretreatment chilled water temperature and Leaving $CWT_{pre}$ can represent a leaving pretreatment chilled water temperature.

At 210, the method 200 can include determining a post-treatment efficacy of the climate control system. As discussed herein, the post-treatment measurement can be taken a time period after a treatment has been administered. In an example, the post-treatment measurements can be taken approximately four weeks after the treatment has been administered. At 212, the post-treatment efficacy can be a determined using a quotient of an adjusted pretreatment power consumption and a post-treatment load. In an example, the post-treatment efficacy ($E_{post}$) can be determined using equation (22):

$$E_{post} = \frac{(\text{Adjusted } kW_{post})}{L_{post}} \quad \text{Equation (22)}$$

where $kW_{post}$ can represent a post-treatment power consumption and $L_{post}$ can represent the post-treatment load (e.g., operating tons per hour).

At 214, the post-treatment load can be determined by scaling a post-treatment chiller water flow through a chiller barrel of a climate control system with at least a post-treatment chiller water temperature difference across a chiller barrel. In an example, the post-treatment load ($L_{pre}$) can be calculated using equation (23):

$$L_{post} = \frac{(GPM_{post} * 8.34 * 60 * \Delta CW_{post})}{Y} \quad \text{Equation (23)}$$

where $GPM_{post}$ can represent a post-treatment chiller water flow (e.g., gallons per minute) through a chiller barrel, $\Delta CW_{post}$ can represent a post-treatment chiller water temperature difference across the chiller barrel, and Y can represent a scaling value such as within a range of from 500 to 30,000. The pretreatment chiller water temperature difference can be calculated by taking the difference between the post-treatment entering chiller water temperature and the post-treatment leaving entering chiller water temperature. In an example, the post-treatment chiller water temperature difference ($\Delta CW_{post}$) can be determined by using equation (24):

$$\Delta CW_{post} = \text{Entering } CWT_{post} - \text{Leaving } CWT_{post} \quad \text{Equation (24)}$$

where Entering $CWT_{post}$ can represent an entering post-treatment chilled water temperature entering the chiller barrel and Leaving $CWT_{post}$ can represent a leaving post-treatment chilled water temperature leaving the chiller barrel.

At 216, the adjusted post-treatment power consumption can be determined by multiplying a scaled post-treatment measured voltage with at least an adjusted post-treatment amperage. In an example, the adjusted post-treatment power consumption (Adjusted $kW_{post}$) can be calculated using equation (25):

$$\text{Adjusted } kW_{post} = \frac{(V_{post} * \text{Adjusted } A_{post} * \text{Power Factor} * (B))}{1000} \quad \text{Equation (25)}$$

where the $V_{post}$ can represent a post-treatment measured voltage of the climate control system, the Adjusted $A_{post}$ can represent an adjusted post-treatment measured amperage of the climate control system, B can represent a scaling value such as within a range of from 1.0 to 2.0, and the Power Factor can represent a scaling value such as within a range of from 0.001 and 5.00. B can represent a predetermined or specified constant and can be represented by 1.732 (square root of 3), which can be derived from Watt's law. However, in some examples, the predetermined or specified constant B can be adjusted or varied from 1.732.

At 218, the method 200 can include determining whether a post-treatment outside air temperature is greater than a pretreatment outside air temperature. At 220, when the post-treatment outside air temperature is greater than the pretreatment outside air temperature, then the adjusted post-treatment measured amperage can be determined by multiplying a decreased post-treatment measured amperage and at least a total percentage difference of at least one of the post-treatment outside air temperature compared to the pre-treatment outside air temperature and a post-treatment condenser chiller fluid temperature compared to the pre-treatment condenser chiller fluid temperature. In an example, the decreased post-treatment measured amperage can be the post-treatment measured current adjusted downward approximately 70%. In an example, when the post-treatment outside air temperature is greater than the pre-treatment outside air temperature, then the adjusted post-treatment measured amperage (Adjusted $A_{post}$) can be calculated using equation (26):

$$\text{Adjusted } A_{post} = \begin{bmatrix} \left[ \left( A_{pre} * (Z) * \dfrac{ECWT_{post} - ECWT_{pre}}{ECWT_{pre}} \right) \right] - \\ \left[ \left( A_{pre} - \left( A_{pre} * (Z) * \dfrac{ECWT_{post} - ECWT_{pre}}{ECWT_{pre}} \right) \right) * \\ (Z) * \left( \dfrac{OAT_{post} - OAT_{pre}}{OAT_{pre}} \right) \right] \end{bmatrix} \quad \text{Equation (26)}$$

where $ECWT_{post}$ can represent a post-treatment condenser water temperature entering the chiller, $ECWT_{pre}$ can represent a pretreatment condenser water temperature entering the chiller, and Z can represent a scaling value such as within a range from 0.0 to 1.0. The adjusted post-treatment measured current (Adjusted $A_{post}$) can be used to adjust for the effect of weather on current (e.g., amperage). Current can be used for the adjusted kilowatts calculation. Therefore, the current and weather relationship can be modeled so the kilowatts can be calculated to match the pretreatment current.

At 222, when the post-treatment outside air temperature is warmer than the pretreatment outside air temperature, then the adjusted post-treatment measured amperage can be determined by multiplying an increased post-treatment measured current and at least a total percentage difference of at least one of the post-treatment outside air temperature compared to the pre-treatment outside air and a post-treatment condenser chiller fluid temperature compared to the pre-treatment condenser chiller fluid temperature. In an example, the increased post-treatment measured current can be the post-treatment measured current adjusted upward approximately 70%. In an example, when the post-treatment outside air temperature is not greater than the pretreatment outside air temperature, then the adjusted post-treatment measured amperage (Adjusted $A_{post}$) can be calculated using equation (27):

$$\text{Adjusted } A_{post} = \begin{bmatrix} \left[ \left( A_{pre} * (Z) * \dfrac{ECWT_{post} - ECWT_{pre}}{ECWT_{pre}} \right) \right] + \\ \left[ \left( A_{pre} + \left( A_{pre} * (Z) * \dfrac{ECWT_{post} - ECWT_{pre}}{ECWT_{pre}} \right) \right) * \\ (Z) * \left( \dfrac{OAT_{post} - OAT_{pre}}{OAT_{pre}} \right) \right] \end{bmatrix} \quad \text{Equation (27)}$$

where $ECWT_{post}$ can represent a post-treatment condenser water temperature entering the chiller, $ECWT_{pre}$ can represent a pretreatment condenser water temperature entering the chiller, and Z can represent a scaling value such as within a range from 0.0 to 1.0. As described herein, the adjusted post-treatment measured amperage (Adjusted $A_{post}$) can be used to model the amperage and weather relationship so that we can calculate the kilowatts to match the pretreatment amperes.

At 224, the method 200 can include determining a pretreatment energy cost per usage time period. The usage time period can be, for example, days, months, or years. In an example, the usage time period can be a year. The pretreatment energy cost per usage time period can represent the cost to operate the climate control system for a year such as based on annual runtime hours. At 226, the pretreatment energy cost per usage time period can be determined by multiplying a product of a cost per unit power and a runtime usage time period by a product of a pretreatment efficacy and a pretreatment load. In an example, the pretreatment energy cost per usage time period ($CPU_{pre}$) can be calculated using Equation (28):

$$CPU_{pre} = [(E_{pre}) \times L_{pre}] \times [\text{runtime per usage time period} * \text{Cost per kW}] \quad \text{Equation (28)}$$

where $E_{pre}$ can represent a pretreatment efficacy, $L_{pre}$ can be a pretreatment load, runtime per usage time period can be the usage timer period, e.g., hours per year, that the climate control system operates, and Cost per kW can be a monetary value per kilowatt. The product of the pretreatment efficacy and the pretreatment load can determine a pretreatment power consumption. The pretreatment power consumption can be determined by scaling a pretreatment measured voltage with at least a pretreatment measured amperage. In an example, the pretreatment power consumption ($kW_{pre}$) can be calculated using Equation (29):

$$kW_{pre} = \dfrac{(V_{pre} \times A_{pre} \times \text{Power Factor})}{1000} \quad \text{Equation (29)}$$

where $V_{pre}$ can represent a pretreatment measured voltage of the climate control system, $A_{pre}$ can represent a pretreatment measured current of the climate control system, and the Power Factor can represent a scaling value such as within a range of from 0.001 and 5.00.

In an example, the pretreatment load ($L_{pre}$) can be calculated using equation (20):

$$L_{pre} = \dfrac{(GPM_{pre} * 8.34 * 60 * \Delta CW_{pre})}{Y} \quad \text{Equation (20)}$$

where $GPM_{pre}$ can represent a pretreatment chiller water flow (e.g., gallons per minute) through a chiller barrel, $\Delta CW_{pre}$ can represent a pretreatment chiller water temperature difference across the chiller barrel, and Y can represent a scaled value such as within a range of from 500 to 30,000.

At 228, the method 200 can include determining a revised pretreatment energy cost per usage time period such as based at least in part on the post-treatment efficacy. The revised pretreatment energy cost per usage time period can represent what it would cost to run the climate control system with the restored capacity (e.g., tonnage). At 230, the revised pretreatment energy cost per usage time period can be determined by multiplying a cost per unit power by a product of an adjusted pretreatment power consumption and the usage time period. In an example, the revised pretreatment energy cost per usage time period (Revised $CPU_{pre}$) can be determined by using equation (30):

$$\text{Revised } CPU_{pre} = [(\text{Adjusted } kW_{pre}) \times (\text{Usage Time Period})] \times \text{Cost per kW} \quad \text{Equation (30)}$$

Where adjusted Adjusted $kW_{pre}$ can represent an adjusted power consumption of the climate control system, Usage Time Period can be the runtime per usage time period, e.g., hours per year, that the climate control system operates, and Cost per kW can be a monetary value per kilowatt. The revised pretreatment energy cost per year (Revised $CPU_{pre}$) can represent the cost of operating the equipment prior to the treatment with the additional tonnage (e.g., output) created by the treatment (e.g., additional or increased capacity).

At 232, the adjusted pretreatment power consumption can be determined by multiplying a pretreatment power efficacy and a post-treatment load. In an example, the adjusted pretreatment power consumption ($kW_{pre}$) can be determined by using equation (31)

$$\text{Adjusted } kW_{pre} = E_{pre} * L_{post} \quad \text{Equation (31)}$$

where $E_{pre}$ can represent a pretreatment efficacy, and $L_{post}$ can represent a post-treatment load.

The method 200, at 234, can include determining a post-treatment energy cost per usage time period. The post-treatment energy cost per usage time period can be determined by multiplying a product of a cost per unit power and a runtime usage time period by a product of a post-treatment efficacy and a post-treatment load. In an example, the post-treatment energy cost per usage time period ($CPU_{post}$) can be calculated using Equation (32):

$$CPU_{post} = [kW_{post}] \times [\text{usage time period} * \text{Cost per kW}] \quad \text{Equation (32)}$$

where $kW_{post}$ can represent a post-treatment power consumption, usage time period can be the runtime per usage time period, e.g., hours per year, that the climate control system operates, and Cost per kW can be a monetary value per kilowatt.

The method 200, at 236, can include calculating a savings (S), such as by using a quotient of a difference of the revised pretreatment energy cost per usage time period (Revised $CPU_{pre}$) and the post-treatment energy cost per usage time period ($CPU_{post}$) and the usage time period. The savings (S) can be calculated using equation (35):

$$S = \left( \frac{CPY_{pre} - CPY_{post}}{\text{Usage time Period}} \right). \quad \text{Equation (35)}$$

Additionally or alternatively, the method can include determining a return on investment (ROI), where the return on investment (ROI) can be determined using equation (36):

$$ROI = \left( \frac{\text{Cost of Treatment}}{\text{Savings}} \right) \quad \text{Equation (36)}$$

Where the Cost of Treatment can represent an overall cost of implementing the treatment, and S can represent the calculated saving per time usage period.

Climate Control System Treatment Cost Savings Evaluation Apparatus

Figure 1B:
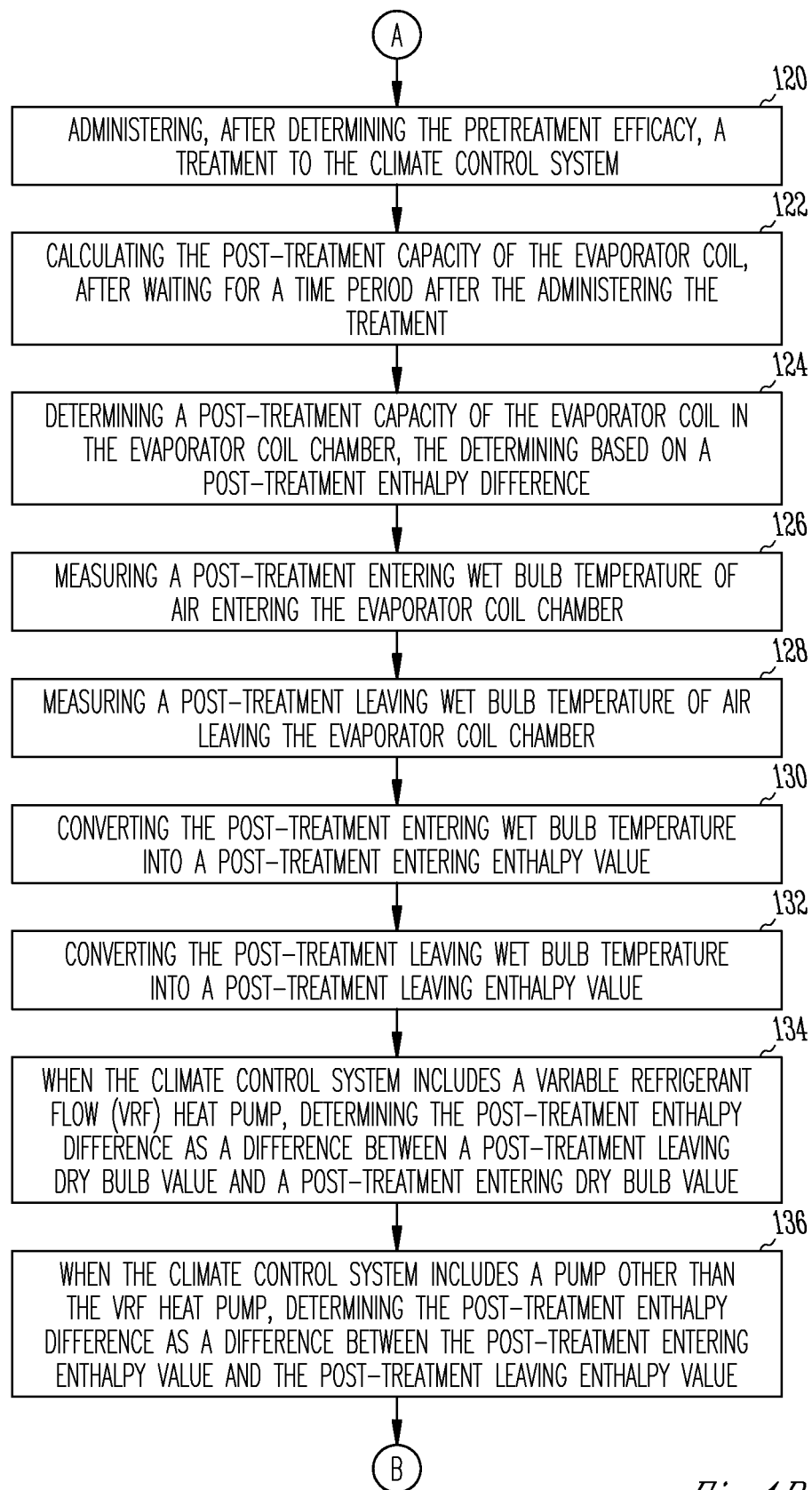
Figure 1C:
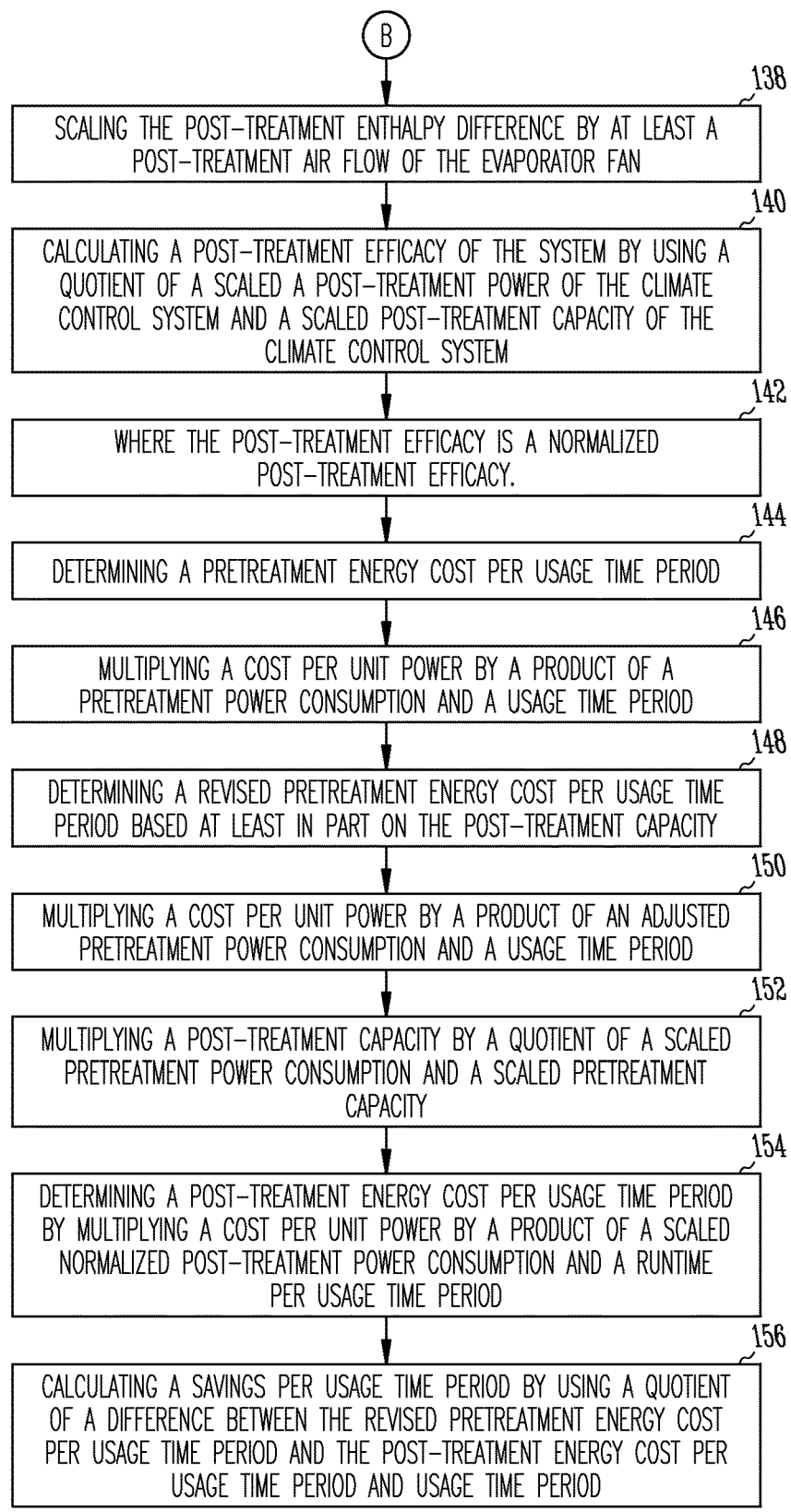
Figure 2A:
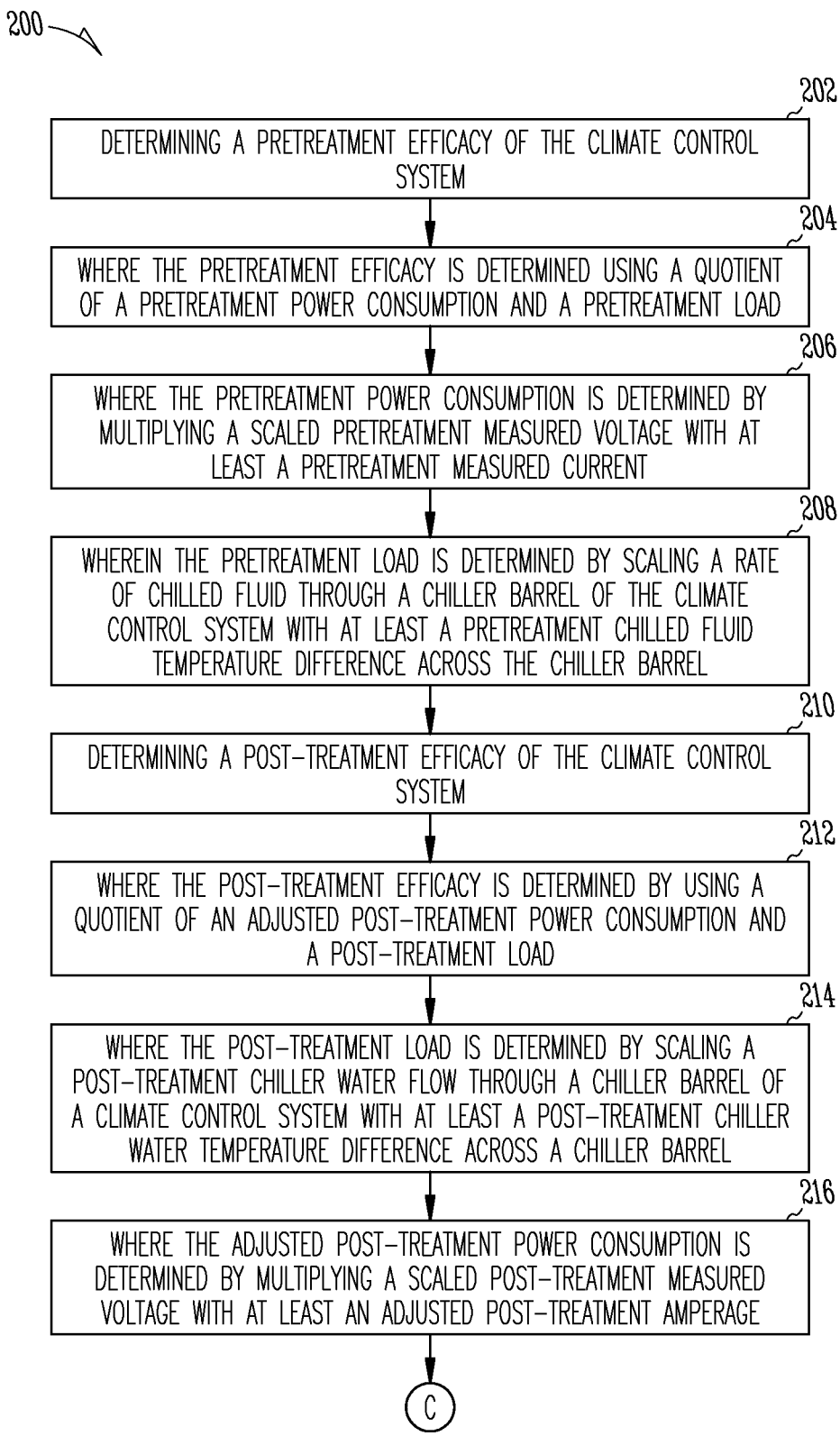
FIGS. 2A-2C are flow diagrams illustrating a method, in accordance with one or more examples of the present disclosure.
Figure 2B:
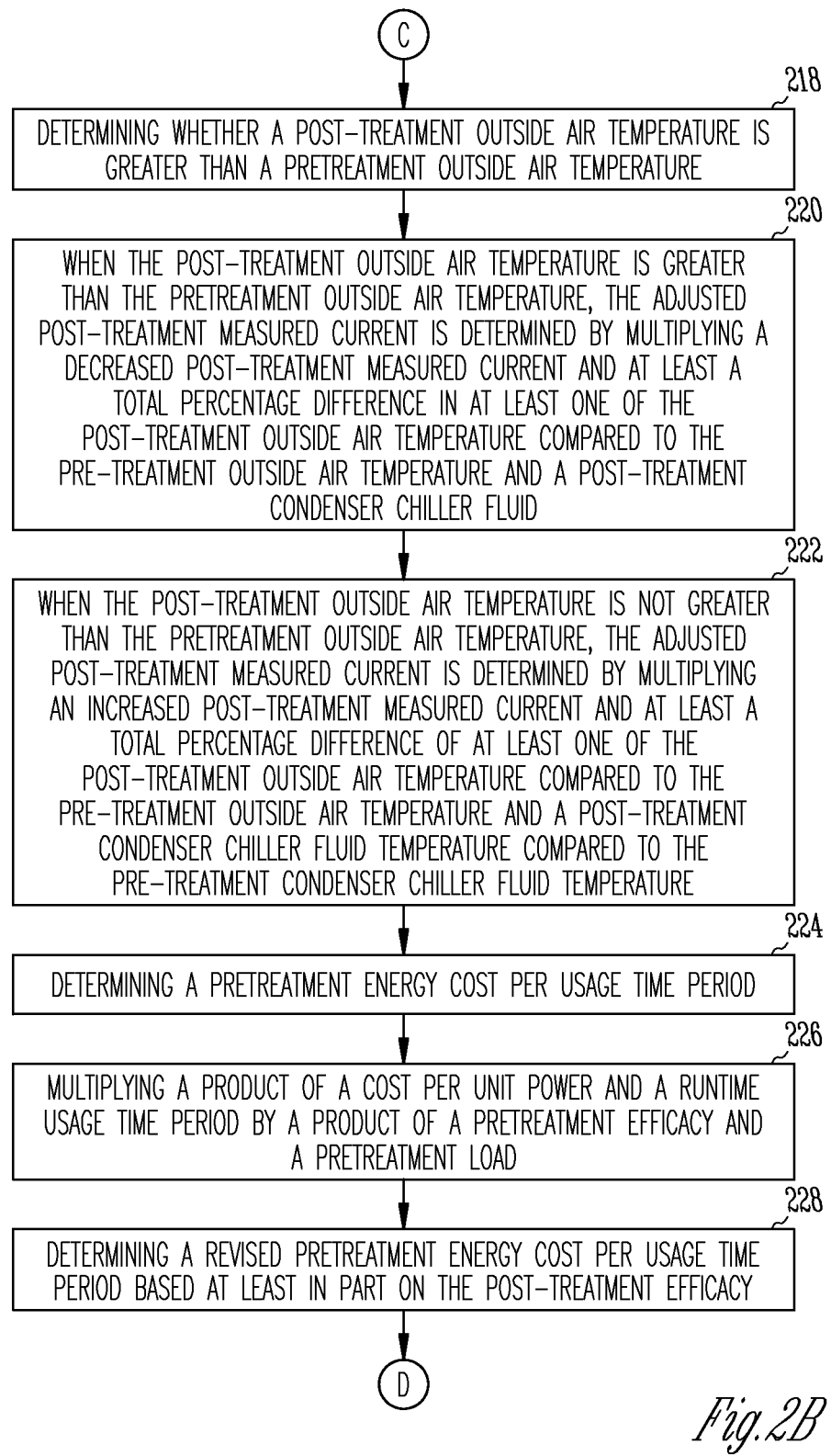
Figure 2C:
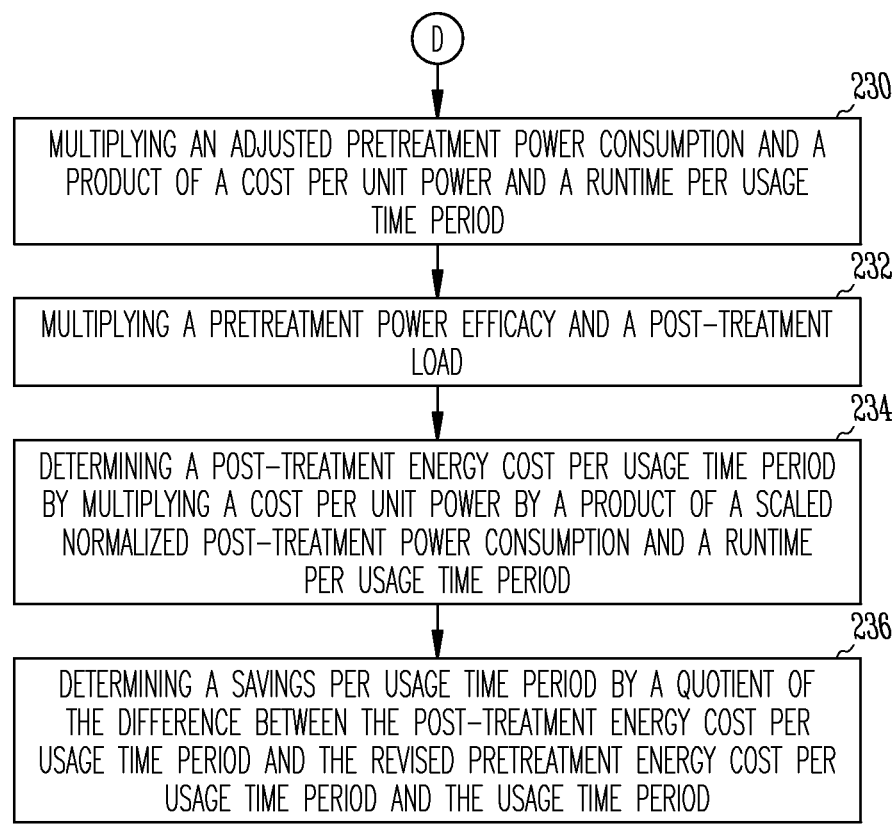
Figure 3:
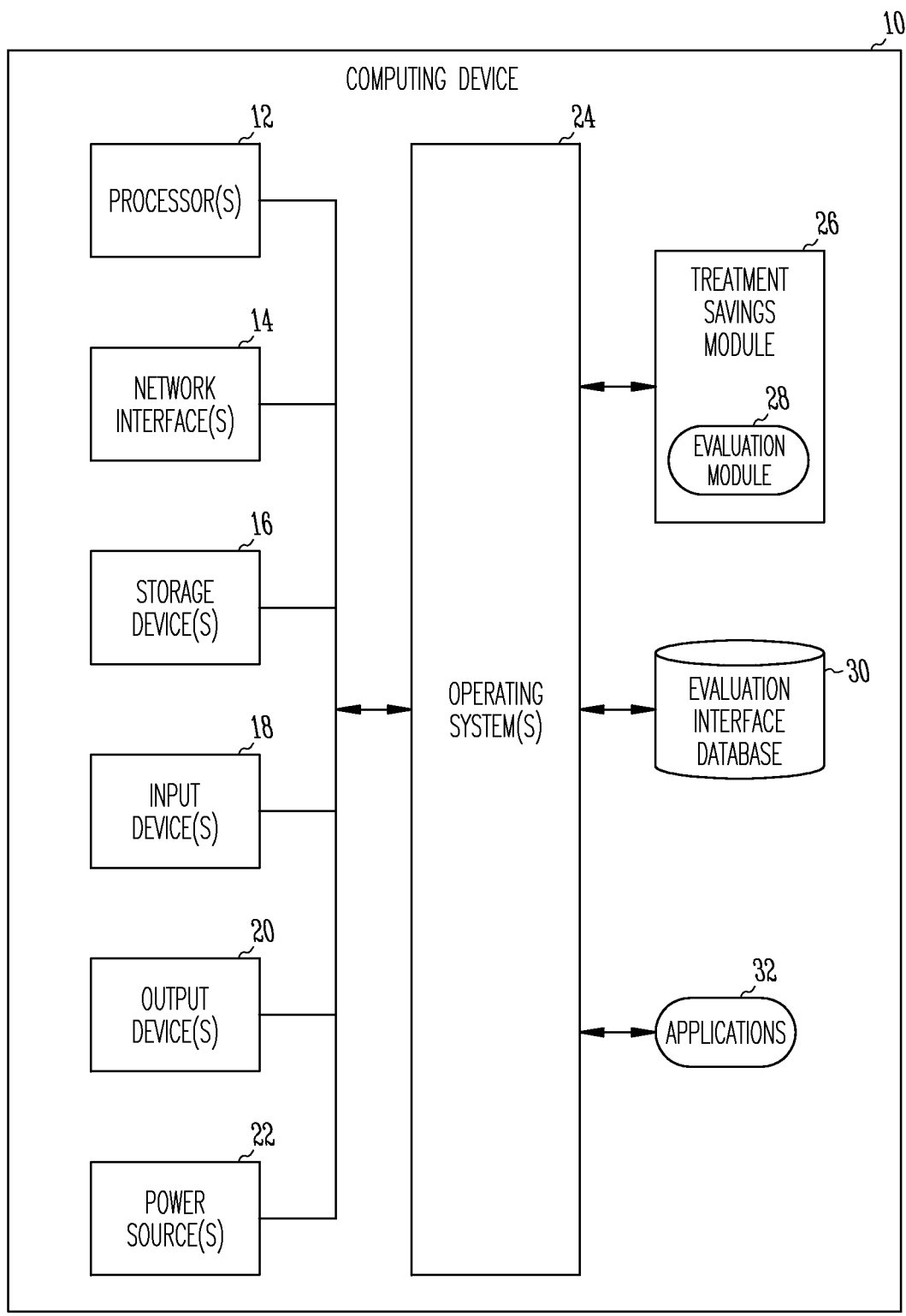
FIG. 3 is a block diagram illustrating details of an example computing device, in accordance with one or more examples of the present disclosure.

A computing system can be configured to help determine cost savings such as can be due to a treatment incorporated into the climate control system. FIG. 1 is a block diagram illustrating details of an example of a computing device that can be so configured. As shown in the example of FIG. 1, a mobile or other computing device 10 can include one or more processors 12, one or more network interfaces 14, one or more storage devices 16, one or more input devices 18, one or more output devices 20, a treatment savings computation module 26, an evaluation interface database 30, a repository 24, and one or more power sources 22. The computing device 10 can also include one or more operating systems 24 that can be executable by the computing device 10.

The one or more input devices 18 can be configured to receive a plurality of data. The input devices 18 can be configured to receive input from a user, such as through tactile, audio, or video input. In an example, the input devices 18 can receive tactile input corresponding to data including data indicating the type of climate control system, pretreatment data, and post-treatment data. The computing device 10 can further include one or more output devices 16. At least one of the output devices 16 can display a graphical user interface (GUI). The computing device 10 can cause one or more of output devices 16 to control or update the GUI such as to include any combination of different user interface controls, text, images, or other graphical content. Displaying or updating the GUI can include causing one or more of the output devices 16 to change the contents of the GUI, which may be displayed to the user.

The evaluation interface database 30 can comprise a logical or physical location (e.g., a logical location that can reference a particular physical location), such as one or more of the storage devices 16. The evaluation interface database 30 can comprise a directory or file of a file system, a database, or a sector or block of a hard disk drive, solid state drive, or flash memory. The evaluation interface database 30 can also reside at least partially in a memory of the storage devices 16.

The treatment savings module 26 can include an evaluation module 28. The evaluation module 28 can use one or more portions of the methods described herein to analyze various values such as can be contained within the pretreatment data and the post-treatment data such as to determine a cost savings of a treatment incorporated into a climate control system that is then used over a time period.

The computing device 10 can further include one or more applications 32, which the one or more processors 50 can execute. Each of the components 12, 14, 16, 18, 20, 22, 24, 26, 30, 32 can be interconnected (e.g., physically, communicatively, or operatively) such as for inter-component communication. One or more processors 50 can be configured to implement functionality or to perform or process one or more instructions such as for execution within the computing device 10. For example, one or more processors 50 can be configured to be capable of processing one or more instructions that can be stored on the one or more storage devices 16.

The one or more storage devices 16 can be configured to store information within the computing device 10 during operation. For instance, the storage device 16 can include a temporary, volatile, or non-volatile memory or other computer-readable storage medium. Examples of a volatile memory can include a random access memory (RAM), a dynamic random access memory (DRAM), a static random access memory (SRAM), or one or more other forms of volatile memories. The storage device 16 can be used to store program instructions for being performed or executed by the one or more processors 12. The storage device 16 can be used by software or one or more applications running on the computing device 10 (e.g., one or more of applications 32) such as to temporarily store information during or between program executions.

The computing device 10 can also include one or more network interfaces 24, such as to communicate with external devices such as via one or more wired or wireless networks. The network interface 24 can include a network interface card, such as an Ethernet card, an optical transceiver, a radio frequency transceiver, or any other type of device that can send and receive information. Other examples of such network interfaces 14 can include a Bluetooth®, 3G, 4G, or WiFi® radio, such as in a mobile computing device or USB. In an example, the computing device 10 can utilize the network interface 14 to wirelessly communicate with an external device such as a server, a mobile phone, or other networked computing device.

The computing device 10, in an example, can include one or more power sources 22, which can be rechargeable and can provide power to the computing device 10. The one or more power sources 22 can be internal to the computing device 10, such as a battery, or can be an external power source. In an example in which the one or more power sources 22 include one or more batteries, the one or more batteries can be made using nickel-cadmium, lithium-ion, or other suitable material.

The mobile computing device 10 can include one or more operating systems 24. The operating system 24, in an example, can control the operation of one or more components of the computing device 10. For example, the operating system 24 can facilitate the interaction of treatment savings module 26 (which may further include the evaluation module 28) with one or more processors 12, one or more network interfaces 14, one or more storage devices 16, one or more input devices 18, one or more output devices 20, or one or more power sources 22.

As shown in the example of FIG. 1, the treatment savings module 26 can include an evaluation module 28. The evaluation module 28 can include program instructions that the computing device 10 can perform or execute. For example, the evaluation module 28 can include instructions that can be performed by the treatment savings module 26 executing on the computing device 10, such as to perform one or more of the operations or actions described in the present disclosure.

In an example, the treatment savings module 26 can receive user input, such as from one or more input device 16. The input can include climate control system data, such as can include a system type (e.g., a model number), a serial number, a date of installation, or an identifier. The identifier can include a project name, which, in turn, can be used to identify the particular climate control system. Based on the climate control system data, the treatment savings module 26 can automatically select one or more of a plurality of evaluation interfaces from the evaluation interface data base 30, such as for display on the output device 20 (e.g., GUI). The treatment savings module 26 can receive pretreatment data, such as described herein, and can populate the evaluation interface with the pretreatment data. Post-treatment data can be taken approximately 4 weeks after the treatment was implemented. The pretreatment data can be entered into the evaluation interface before obtaining the post-treatment data or concurrently. In an example in which the pretreatment data is entered before obtaining or entering the post-treatment data, the treatment savings module 26 can store the partially completed evaluation interface data in the storage device 16, such as until the post-treatment data is obtained and entered.

The treatment savings module 26 can receive the identifier, such as along with any of the other climate control system data, and can retrieve the partially completed evaluation interface data from the storage device 16, and can display the evaluation interface to the user, such as via the output device 20. The treatment savings module 26 can receive a plurality of post-treatment data, such as described herein, along with operating data. The operating data can include a cost of a kilowatt and annual runtime hours. The treatment savings module 26 can include instructions that can cause the one or more processors 12 to analyze the pretreatment data, the post-treatment data, and the operating data, such as according to the methods described herein. In an example, the evaluation module 28 can determine a treatment savings indicating the amount of money saved by incorporating the treatment into the climate control system.

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided.

Example 1 can include or use subject matter (such as an apparatus, a method, a means for performing acts, or a device readable medium including instructions that, when performed by the device, can cause the device to perform acts), such as can include a method of determining savings in a climate control system. The subject matter can include determining a pretreatment capacity of an evaporator coil in an evaporator coil chamber, the determining based on a pretreatment enthalpy difference. The subject matter can include calculating a pretreatment efficacy of the system. The subject matter can include determining a post-treatment capacity of the evaporator coil in the evaporator coil chamber, the determining based on a post-treatment enthalpy difference. The subject matter can include calculating a post-treatment efficacy of the system. The subject matter can include determining a pretreatment energy cost per usage time period. The subject matter can include determining a revised pretreatment energy cost per usage time period based at least in part on the post-treatment capacity.

Example 2 can include or use, or can optionally be combined with the subject matter of Example 1 to include or use determining the pretreatment enthalpy difference, across the evaporator coil, including: measuring a pretreatment entering wet bulb temperature of air entering the evaporator coil chamber; measuring a pretreatment leaving wet bulb temperature of air leaving the chamber evaporator coil chamber; converting the pretreatment entering wet bulb temperature into a pretreatment entering enthalpy value; converting the pretreatment leaving wet bulb temperature into a pretreatment leaving enthalpy value; when the climate control system includes a variable refrigerant flow (VRF) heat pump, determining the pretreatment enthalpy difference as a difference between a pretreatment leaving dry bulb value and a pretreatment entering dry bulb value; and when the climate control system includes a pump other than the VRF heat pump, determining the pretreatment enthalpy difference as a difference between the pretreatment entering enthalpy value and the pretreatment leaving enthalpy value.

Example 3 can include or use, or can optionally be combined with the subject matter of one or any combination of Examples 1 or 2 to optionally include or use the pretreatment capacity of the evaporator coil optionally determined by scaling the pretreatment enthalpy difference by at least a pretreatment air flow rate of the evaporator fan.

Example 4 can include or use, or can optionally be combined with the subject matter of one or any combination of Examples 1 through 3 to optionally include or use the pretreatment efficacy optionally calculated using a quotient of a scaled pretreatment power consumption of the climate control system and a scaled pretreatment capacity of the climate control system.

Example 5 can include or use, or can optionally be combined with the subject matter of one or any combination of Examples 1 through 4 to optionally include or use: administering, after determining the pretreatment efficacy, a treatment to the climate control system; and calculating the post-treatment capacity of the evaporator coil, after waiting for a time period after the administering the treatment.

Example 6 can include or use, or can optionally be combined with the subject matter of one or any combination of Examples 1 through 5 to optionally include or use determining the post-treatment enthalpy difference, across the evaporator coil, which can optionally include or use: measuring a post-treatment entering wet bulb temperature of air entering the evaporator coil chamber; measuring a post-treatment leaving wet bulb temperature of air leaving the evaporator coil chamber; converting the post-treatment entering wet bulb temperature into a post-treatment entering enthalpy value; converting the post-treatment leaving wet bulb temperature into a post-treatment leaving enthalpy value; when the climate control system includes a variable refrigerant flow (VRF) heat pump, determining the post-treatment enthalpy difference as a difference between a post-treatment leaving dry bulb value and a post-treatment entering dry bulb value; and when the climate control system includes a pump other than the VRF heat pump, determining the post-treatment enthalpy difference as a difference between the post-treatment entering enthalpy value and the post-treatment leaving enthalpy value.

Example 7 can include or use, or can optionally be combined with the subject matter of one or any combination of Examples 1 through 6 to optionally include or use the post-treatment capacity of the evaporator coil optionally determined by scaling the post-treatment enthalpy difference by at least a post-treatment air flow of the evaporator fan.

Example 8 can include or use, or can optionally be combined with the subject matter of one or any combination of Examples 1 through 7 to optionally include or use the post-treatment efficacy optionally calculated using a quotient of a scaled a post-treatment power of the climate control system and a scaled post-treatment capacity of the climate control system.

Example 9 can include or use, or can optionally be combined with the subject matter of one or any combination of Examples 1 through 8 to optionally include or use the post-treatment efficacy optionally being a normalized post-treatment efficacy.

Example 10 can include or use, or can optionally be combined with the subject matter of one or any combination of Examples 1 through 9 to optionally include or use the pretreatment energy cost per usage time period optionally determined by multiplying a cost per unit power by a product of a pretreatment power consumption and a usage time period.

Example 11 can include or use, or can optionally be combined with the subject matter of one or any combination of Examples 1 through 10 to optionally include or use determining the revised pretreatment energy cost per usage time period optionally determined by multiplying a cost per unit power by a product of an adjusted pretreatment power consumption and a usage time period.

Example 12 can include or use, or can optionally be combined with the subject matter of one or any combination of Examples 1 through 11 to optionally include or use the adjusted pretreatment power consumption optionally determined by multiplying a post-treatment capacity by a quotient of a scaled pretreatment power consumption and a scaled pretreatment capacity.

Example 13 can include or use, or can optionally be combined with the subject matter of one or any combination of Examples 1 through 12 to optionally include or use determining a post-treatment energy cost per usage time period by multiplying a cost per unit power by a product of a scaled normalized post-treatment power consumption and a runtime per usage time period; and calculating a savings per usage time period by using a quotient of a difference between the revised pretreatment energy cost per usage time period and the post-treatment energy cost per usage time period and usage time period.

Example 14 can include or use, or can optionally be combined with the subject matter of one or any combination of Examples 1 through 13 to optionally include or use the climate control system being a heating ventilation, air conditioning, and refrigeration (HVACR) system and optionally selected from the group consisting of: a water cooled DX single phase HVACR system, a water cooled DX three phase HVACR system, an air cooled DX single phase HVACR system, and an air cooled DX three phase HVACR system.

Example 15 can include or use, or can optionally be combined with the subject matter of one or any combination of Examples 1 through 14 to optionally include or use determining a pretreatment efficacy of the climate control system; determining a post-treatment efficacy of the climate control system; determining a pretreatment energy cost per usage time period; and determining a revised pretreatment energy cost per usage time period based at least in part on the post-treatment efficacy.

Example 16 can include or use, or can optionally be combined with the subject matter of one or any combination of Examples 1 through 15 to optionally include or use the pretreatment efficacy optionally determined using a quotient of a pretreatment power consumption and a pretreatment load.

Example 17 can include or use, or can optionally be combined with the subject matter of one or any combination of Examples 1 through 16 to optionally include or use the pretreatment power consumption optionally determined by multiplying a scaled pretreatment measured voltage with at least a pretreatment measured current, and wherein the pretreatment load is determined by scaling a rate of chilled fluid through a chiller barrel of the climate control system with at least a pretreatment chilled fluid temperature difference across the chiller barrel.

Example 18 can include or use, or can optionally be combined with the subject matter of one or any combination of Examples 1 through 17 to optionally include or use the post-treatment efficacy optionally determined by using a quotient of an adjusted post-treatment power consumption and a post-treatment load.

Example 19 can include or use, or can optionally be combined with the subject matter of one or any combination of Examples 1 through 18 to optionally include or use the adjusted post-treatment power consumption being determined by multiplying a scaled post-treatment measured voltage with at least an adjusted post-treatment amperage, and wherein the post-treatment load is determined by scaling a post-treatment chiller water flow through a chiller barrel of a climate control system with at least a post-treatment chiller water temperature difference across a chiller barrel.

Example 20 can include or use, or can optionally be combined with the subject matter of one or any combination of Examples 1 through 19 to optionally include or use determining whether a post-treatment outside air temperature is greater than a pretreatment outside air temperature; when the post-treatment outside air temperature is greater than the pretreatment outside air temperature, the adjusted post-treatment measured current optionally determined by multiplying a decreased post-treatment measured current and at least a total percentage difference in at least one of the post-treatment outside air temperature compared to the pre-treatment outside air temperature and a post-treatment condenser chiller fluid temperature compared to the pretreatment condenser chiller fluid temperature; and when the post-treatment outside air temperature is not greater than the pretreatment outside air temperature, the adjusted post-treatment measured current optionally determined by multiplying an increased post-treatment measured current and at least a total percentage difference of at least one of the post-treatment outside air temperature compared to the pre-treatment outside air temperature and a post-treatment condenser chiller fluid temperature compared to the pretreatment condenser chiller fluid temperature.

Example 21 can include or use, or can optionally be combined with the subject matter of one or any combination of Examples 1 through 20 to optionally include or use the pretreatment energy cost per usage time period optionally determined by multiplying a product of a cost per unit power and a runtime usage time period by a product of a pretreatment efficacy and a pretreatment load.

Example 22 can include or use, or can optionally be combined with the subject matter of one or any combination of Examples 1 through 22 to optionally include or use the revised pretreatment energy cost per usage time period is determined by multiplying an adjusted pretreatment power consumption and a product of a cost per unit power and a runtime per usage time period.

Example 23 can include or use, or can optionally be combined with the subject matter of one or any combination of Examples 1 through 22 to optionally include or use the adjusted pretreatment power consumption optionally determined by multiplying a pretreatment power efficacy and a post-treatment load.

Example 24 can include or use, or can optionally be combined with the subject matter of one or any combination of Examples 1 through 23 to optionally include or use determining a post-treatment energy cost per usage time period by multiplying a cost per unit power by a product of a scaled normalized post-treatment power consumption and a runtime per usage time period; and determining a savings per usage time period by a quotient of the difference between the post-treatment energy cost per usage time period and the revised pretreatment energy cost per usage time period the revised and the usage time period.

Example 25 can include or use, or can optionally be combined with the subject matter of one or any combination of Examples 1 through 24 to optionally include or use the climate control system optionally being a water cooled chiller (WCC) system.

Example 26 can include or use, or can optionally be combined with the subject matter of one or any combination of Examples 1 through 25 to optionally include or use a computing device, comprising: at least one input device configured to receive a plurality of input data; at least one output device configured to display a graphical user interface; and at least one processor configured to: determine a type of climate control system based on a plurality of first data; select, based on the type of climate control system, an evaluation interface to be displayed at the graphical user interface; and generate an amount of savings over a time period for a treatment incorporated into a climate control system based on pretreatment data and post-treatment data.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of determining savings in a climate control system, comprising:
   determining, by one or more modules of a treatment savings system, a pretreatment capacity of an evaporator coil in an evaporator coil chamber of the climate control system, the determining based on a pretreatment enthalpy difference;
   calculating, by the one or more modules of the treatment savings system, a pretreatment efficacy of the system;
   introducing a chemical additive into the evaporator coil to prevent the pretreatment capacity of the evaporator coil from decreasing or restore a previously lost capacity of the evaporator coil;
   determining, by the one or more modules of the treatment savings system, a post-treatment capacity of the evaporator coil in the evaporator coil chamber of the climate control system, the determining based on a post-treatment enthalpy difference;
   calculating, by the one or more modules of the treatment savings system, a post-treatment efficacy of the climate control system;
   determining, by the one or more modules of the treatment savings system, a pretreatment energy cost per usage time period; and
   determining, by the one or more modules of the treatment savings system, a revised pretreatment energy cost per usage time period based at least in part on the post-treatment capacity.

2. The method of claim 1, including:
   determining, by the one or more modules in the treatment savings system, the pretreatment enthalpy difference, across the evaporator coil, including:
   receiving pretreatment entering wet bulb temperature of air entering the evaporator coil chamber;
   receiving a pretreatment leaving wet bulb temperature of air leaving the chamber evaporator coil chamber;
   converting the pretreatment entering wet bulb temperature into a pretreatment entering enthalpy value;
   converting the pretreatment leaving wet bulb temperature into a pretreatment leaving enthalpy value;
   when the climate control system includes a variable refrigerant flow (VRF) heat pump, determining the pretreatment enthalpy difference as a difference between a pretreatment leaving dry bulb value and a pretreatment entering dry bulb value; and
   when the climate control system includes a pump other than the VRF heat pump, determining the pretreatment enthalpy difference as a difference between the pretreatment entering enthalpy value and the pretreatment leaving enthalpy value.

3. The method of claim 1, further including:
   receiving, by the one or more modules in the treatment savings system, a pretreatment air flow rate of the evaporator fan; and
   scaling, by the one or more modules in the treatment savings system, the pretreatment enthalpy difference by at least the pretreatment airflow rate of the evaporator fan.

4. The method of claim 1, wherein the pretreatment efficacy is calculated, by the one or more modules in the treatment savings system, using a quotient of a scaled pretreatment power consumption of the climate control system and a scaled pretreatment capacity of the climate control system.

5. The method of claim 1, including:
   calculating, by the one or more modules in the treatment savings system, the post-treatment capacity of the evaporator coil, after waiting for a time period after introducing the chemical additive.

6. The method of claim 1, including:
   determining, by the one or more modules in the treatment savings system, the post-treatment enthalpy difference, across the evaporator coil, including:
   receiving a post-treatment entering wet bulb temperature of air entering the evaporator coil chamber;
   receiving a post-treatment leaving wet bulb temperature of air leaving the evaporator coil chamber;
   converting the post-treatment entering wet bulb temperature into a post-treatment entering enthalpy value;
   converting the post-treatment leaving wet bulb temperature into a post-treatment leaving enthalpy value;
   when the climate control system includes a variable refrigerant flow (VRF) heat pump, determining the post-treatment enthalpy difference as a difference between a post-treatment leaving dry bulb value and a post-treatment entering dry bulb value; and
   when the climate control system includes a pump other than the VRF heat pump, determining the post-treatment enthalpy difference as a difference between the post-treatment entering enthalpy value and the post-treatment leaving enthalpy value.

7. The method of claim 6, further including:
   receiving, by the one or more modules in the treatment savings system, a post-treatment air flow rate of the evaporator fan;
   scaling, by the one or more modules in the treatment savings system, the post-treatment enthalpy difference by at least a post-treatment airflow of the evaporator fan.

8. The method of claim 1, wherein the post-treatment efficacy is calculated, by the one or more modules in the treatment savings system, using a quotient of a scaled a post-treatment power of the climate control system and a scaled post-treatment capacity of the climate control system.

9. The method of claim 1, wherein the post-treatment efficacy is a normalized post-treatment efficacy.

10. The method of claim 1, wherein the pretreatment energy cost per usage time period is determined, by the one or more modules in the treatment savings system, by multiplying a cost per unit power by a product of a pretreatment power consumption and a usage time period.

11. The method of claim 1, wherein determining the revised pretreatment energy cost per usage time period is determined, by the one or more modules in the treatment savings system, by multiplying a cost per unit power by a product of an adjusted pretreatment power consumption and a usage time period.

12. The method of claim 11, wherein the adjusted pretreatment power consumption is determined, by the one or more modules in the treatment savings system, by multiplying a post-treatment capacity by a quotient of a scaled pretreatment power consumption and a scaled pretreatment capacity.

13. The method of claim 1, including:
determining, by the one or more modules in the treatment savings system, a post-treatment energy cost per usage time period by multiplying a cost per unit power by a product of a scaled normalized post-treatment power consumption and a runtime per usage time period; and
calculating, by the one or more modules in the treatment savings system, the savings per usage time period by using a quotient of a difference between the revised pretreatment energy cost per usage time period and the post-treatment energy cost per usage time period and usage time period.

14. The method of claim 1, wherein the climate control system is a heating ventilation, air conditioning, and refrigeration (HVACR) system and is selected from the group consisting of:
a water cooled DX single phase HVACR system, a water cooled DX three phase HVACR system, an air cooled DX single phase HVACR system, and an air cooled DX three phase HVACR system.

15. A method of determining savings in a climate control system, comprising:
receiving, by one or more modules in a treatment savings system, a climate control system identifier corresponding to a climate control system;
selecting, by the one or more modules in the treatment savings system, an evaluation interface corresponding to the climate control system to be presented on a user interface;
receiving, by the one or more modules of the treatment savings system, pretreatment information associated with the climate control system;
determining, by the one or more modules of the treatment savings system, a pretreatment efficacy of the climate control system;
receiving, by one or more modules in a treatment savings system, the climate control system identifier corresponding to the climate control system;
displaying, by the one or more modules in the treatment savings system, a partially populated evaluation interface corresponding to the climate control system, the partially populated evaluation interface including at least the pretreatment information;
introducing a chemical additive into the evaporator coil to prevent the pretreatment capacity of the evaporator coil from decreasing or restore a previously lost capacity of the evaporator coil;
receiving, by the one or more modules of the treatment savings system, post-treatment information associated with the climate control system;
determining, by the one or more modules of the treatment savings system, a post-treatment efficacy of the climate control system;
determining, by the one or more modules of the treatment savings system, a pretreatment energy cost per usage time period; and
determining, by the one or more modules of the treatment savings system, a revised pretreatment energy cost per usage time period based at least in part on the post-treatment efficacy.

16. The method of claim 15, wherein the pretreatment efficacy is determined, by the one or more modules of the treatment savings system, using a quotient of a pretreatment power consumption and a pretreatment load.

17. The method of claim 16, wherein the pretreatment power consumption is determined, by the one or more modules of the treatment savings system, by multiplying a scaled pretreatment measured voltage with at least a pretreatment measured current, and wherein the pretreatment load is determined, by the one or more modules of the treatment savings system, by scaling a rate of chilled fluid through a chiller barrel of the climate control system with at least a pretreatment chilled fluid temperature difference across the chiller barrel.

18. The method of claim 15, wherein the post-treatment efficacy is determined, by the one or more modules of the treatment savings system, y using a quotient of an adjusted post-treatment power consumption and a post-treatment load.

19. The method of claim 18, wherein the adjusted post-treatment power consumption is determined, by the one or more modules of the treatment savings system, by multiplying a scaled post-treatment measured voltage with at least an adjusted post-treatment amperage, and wherein the post-treatment load is determined, by the one or more modules of the treatment savings system, by scaling a post-treatment chiller water flow through a chiller barrel of a climate control system with at least a post-treatment chiller water temperature difference across a chiller barrel.

20. The method of claim 19, including:
receiving, by the one or more modules of the treatment savings system, a post-treatment outside air temperature;
when the post-treatment outside air temperature is greater than the pretreatment outside air temperature, the adjusted post-treatment measured current is determined, by the one or more modules of the treatment savings system, by multiplying a decreased post-treatment measured current and at least a total percentage difference in at least one of the post-treatment outside air temperature compared to the pre-treatment outside air temperature and a post-treatment condenser chiller fluid temperature compared to the pre-treatment condenser chiller fluid temperature; and
when the post-treatment outside air temperature is not greater than the pretreatment outside air temperature, the adjusted post-treatment measured current is determined, by the one or more modules of the treatment savings system, by multiplying an increased post-treatment measured current and at least a total percentage difference of at least one of the post-treatment outside air temperature compared to the pre-treatment outside air temperature and a post-treatment condenser chiller fluid temperature compared to the pre-treatment condenser chiller fluid temperature.

21. The method of claim 15, wherein the pretreatment energy cost per usage time period is determined, by the one or more modules of the treatment savings system, by multiplying a product of a cost per unit power and a runtime usage time period by a product of a pretreatment efficacy and a pretreatment load .

22. The method of claim 15, wherein the revised pretreatment energy cost per usage time period is determined, by the one or more modules of the treatment savings system, by multiplying an adjusted pretreatment power consumption and a product of a cost per unit power and a runtime per usage time period.

23. The method of claim 22, wherein the adjusted pretreatment power consumption is determined, by the one or more modules of the treatment savings system, by multiplying a pretreatment power efficacy and a post-treatment load.

24. The method of claim 15, including:
   determining, by the one or more modules of the treatment savings system, a post-treatment energy cost per usage time period by multiplying a cost per unit power by a product of a scaled normalized post-treatment power consumption and a runtime per usage time period; and
   determining, by the one or more modules of the treatment savings system, a savings per usage time period by using a quotient of the difference between the revised pretreatment energy cost per usage time period and the post-treatment energy cost per usage time period and usage time period.

25. The method of claim 15, wherein the climate control system is a water cooled chiller (WCC) system.

* * * * *